United States Patent
Harada

(10) Patent No.: US 9,396,573 B2
(45) Date of Patent: Jul. 19, 2016

(54) IMAGE GENERATING DEVICE, IMAGE GENERATING METHOD, AND INFORMATION STORAGE MEDIUM

(71) Applicant: SONY COMPUTER ENTERTAINMENT INC., Tokyo (JP)

(72) Inventor: Hidehisa Harada, Saitama (JP)

(73) Assignees: SONY CORPORATION, Tokyo (JP); SONY INTERACTIVE ENTERTAINMENT INC., Tokyo (JP)

(*) Notice: Subject to any disclaimer, the term of this patent is extended or adjusted under 35 U.S.C. 154(b) by 339 days.

(21) Appl. No.: 13/873,544

(22) Filed: Apr. 30, 2013

(65) Prior Publication Data
US 2013/0300749 A1 Nov. 14, 2013

(30) Foreign Application Priority Data
May 10, 2012 (JP) .................................. 2012-108836

(51) Int. Cl.
*G06T 13/20* (2011.01)
(52) U.S. Cl.
CPC ...................................... *G06T 13/20* (2013.01)
(58) Field of Classification Search
CPC ............ G06T 7/20; G06T 2207/10016; G06T 2207/30201; G06T 11/00; G06T 7/0046; G06T 15/06; G06T 2207/30241; G06T 7/2033; G06T 7/40; G06T 19/006; G06T 2207/20021; G06T 2207/30196
See application file for complete search history.

(56) References Cited

U.S. PATENT DOCUMENTS

| | | | |
|---|---|---|---|
| 2003/0179204 A1* | 9/2003 | Mochizuki et al. ........... | 345/473 |
| 2005/0128220 A1* | 6/2005 | Marrin et al. ................. | 345/619 |
| 2008/0253735 A1* | 10/2008 | Kuspa et al. .................... | 386/52 |
| 2011/0096077 A1* | 4/2011 | Jarrett et al. .................. | 345/473 |

OTHER PUBLICATIONS

Park, Sang Il, et al. "On-line motion blending for real-time locomotion generation." Computer Animation and Virtual Worlds 15.3-4 (2004): 125-138.*
Kim, Manmyung, et al. "Synchronized multi-character motion editing." ACM transactions on graphics (TOG) 28.3 (2009): 79.*

* cited by examiner

*Primary Examiner* — Sultana M Zalalee
(74) *Attorney, Agent, or Firm* — Katten Muchin Rosenman LLP

(57) ABSTRACT

Provided is an information storage medium having stored thereon a program for causing a computer to execute processing for: acquiring a tentative time interval between a frame for generating an image and a previous frame; acquiring, when a condition associated with action data indicating a posture of an object in accordance with time is satisfied, the posture of the object at a time point at which a time interval shorter than the tentative time interval has elapsed since the previous frame based on the action data; and rendering the image indicating the acquired posture of the object.

7 Claims, 11 Drawing Sheets

| ANIMATION | ACTION DATA | SUBSEQUENT ANIMATION | HEAD REPRO-DUCING FLAG | FRAME RATE |
|---|---|---|---|---|
| ANIMATION A | data1 | ANIMATION B | false | |
| ANIMATION B | data2 | | true | |
| ANIMATION C | data3 | ANIMATION C | false | 30 |
| ANIMATION D | data4 | ANIMATION E | false | |
| ANIMATION E | data5 | | false | 30 |

# IMAGE GENERATING DEVICE, IMAGE GENERATING METHOD, AND INFORMATION STORAGE MEDIUM

CROSS-REFERENCE TO RELATED APPLICATION

The present application claims priority from Japanese application JP2012-108836 filed on May 10, 2012, the content of which is hereby incorporated by reference into this application.

BACKGROUND OF THE INVENTION

1. Field of the Invention

The present invention relates to an image generating device, an image generating method, and an information storage medium.

2. Description of the Related Art

There is an image generating device for generating in real time a three-dimensional motion picture representing a motion of an object in accordance with an input of a user. A motion picture is expressed by switching still pictures each time a given time elapses. Each of the still pictures that form the motion picture is called "frame". An image generating device generates images of those frames by using action data, which is information on a posture of an object in accordance with time. The image generating device samples, from the action data, the posture of the object at the time (sampling time) corresponding to the frame, and outputs image data on the frame indicating the posture of the object.

An interval between the sampling time for a given frame and the sampling time for the subsequent frame normally has a fixed value or is caused to change depending on an actual calculation time of processing for generating the image of the frame.

In that case, a characteristic of the action sometimes does not appear in the image of each frame depending on a relationship between an action of the object and the interval between the sampling times. For example, with regard to a jumping action of the object, the frame for expressing an instant at which a peak of the jump is reached sometimes does not exist, resulting in a failure to express a height by which the object has jumped. Further, there is a fear that a collision or contact that should take place may not happen if a result of performing the sampling from the action data is used for collision judgment. In addition, for example, in a case of a rotational motion of a wheel, the wheel sometimes appears to be rotating reversely if a time interval between the frames becomes longer for some reason.

SUMMARY OF THE INVENTION

The present invention has been made in view of the above-mentioned problems, and therefore has an object to provide a technology capable of generating an image of a frame corresponding to a characteristic of an action of an object.

In order to solve the above-mentioned problems, a non-transitory information storage medium according to an exemplary embodiment of the present invention has stored thereon a program for causing a computer to execute processing for: acquiring a tentative time interval between a frame for generating an image and a previous frame; acquiring, when a condition associated with action data indicating a posture of an object in accordance with time is satisfied, the posture of the object at a time point at which a time interval shorter than the tentative time interval has elapsed since the previous frame based on the action data; and rendering the image indicating the acquired posture of the object.

Further, an image generating device according to the exemplary embodiment of the present invention includes: tentative time interval acquisition means for acquiring a tentative time interval between a frame for generating an image and a previous frame; posture acquisition means for acquiring, when a condition associated with action data indicating a posture of an object in accordance with time is satisfied, the posture of the object at a time point at which a time interval shorter than the tentative time interval has elapsed since the previous frame based on the action data; and image outputting means for outputting data on the image indicating the acquired posture of the object.

Further, an image generating method according to the exemplary embodiment of the present invention includes: acquiring a tentative time interval between a frame for generating an image and a previous frame; acquiring, when a condition associated with action data indicating a posture of an object in accordance with time is satisfied, the posture of the object at a time point at which a time interval shorter than the tentative time interval has elapsed since the previous frame based on the action data; and outputting data on the image indicating the acquired posture of the object.

According to the present invention, the image of the frame corresponding to a characteristic of an action of the object may be generated.

According to the exemplary embodiment of the present invention, the processing for acquiring the posture of the object may include acquiring, when the tentative time interval includes a time point associated with the action data, the posture of the object at the associated time point.

According to the exemplary embodiment of the present invention, the action data may indicate the posture of the object in accordance with time during a given period, and the processing for acquiring the posture of the object may include acquiring, when the tentative time interval includes a time point of a head of the given period within the action data, the posture of the object at the time point of the head.

According to the exemplary embodiment of the present invention, the head of the given period within the action data may sequentially follow an end of a period within previous action data that comes before a transition is made to the action data.

According to the exemplary embodiment of the present invention, the processing for acquiring the posture of the object may include acquiring, when a maximum time interval associated with the action data is smaller than the tentative time interval, the posture of the object at a time point at which the maximum time interval has elapsed since the previous frame.

DETAILED DESCRIPTION OF THE INVENTION

Figure 1:
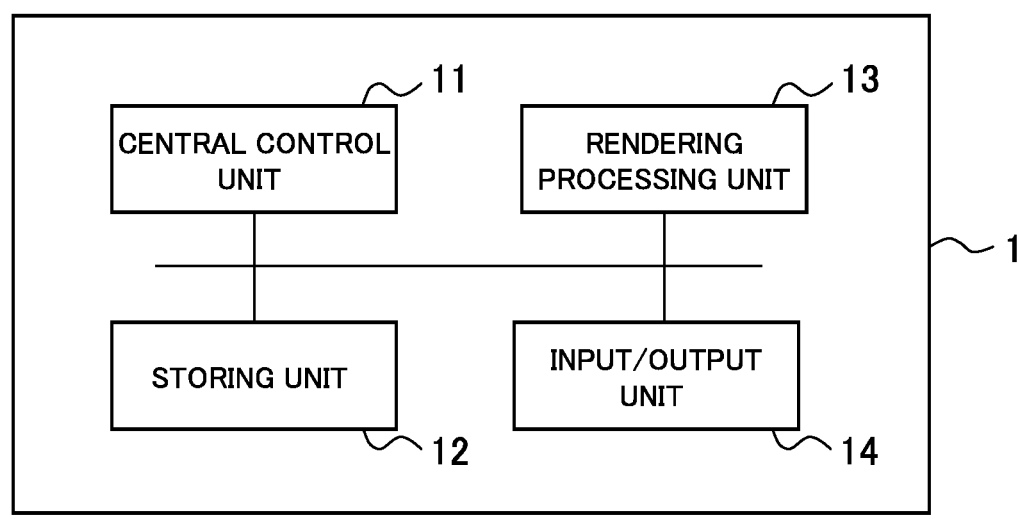
FIG. 1 is a diagram illustrating an example of a configuration of an image generating device according to an embodiment of the present invention.

Next, an embodiment of the present invention is described with reference to the accompanying drawings. Of the appearing components, those having the same function are denoted by the same reference characters, and a description thereof is omitted.

FIG. 1 is a diagram illustrating a configuration of an image generating device 1 according to the embodiment of the present invention. The image generating device 1 includes a central control unit 11, a storing unit 12, a rendering processing unit 13, and an input/output unit 14. The image generating device 1 is a device having a function of generating a three-dimensional image, as exemplified by a personal computer or a consumer game machine.

The central control unit 11 operates in accordance with a program stored in the storing unit 12 and controls the rendering processing unit 13 and the input/output unit 14. Note that, the above-mentioned program may be provided by being stored in a computer-readable storage medium such as a DVD-ROM, or may be provided via a network such as the Internet.

The storing unit 12 includes a memory element such as a RAM or a ROM, a hard disk drive, and the like. The storing unit 12 stores the above-mentioned program. The storing unit 12 also stores information input from the respective units and operation results.

The rendering processing unit 13 has a function of performing numerical calculation in parallel in accordance with the program stored in the storing unit 12 and a function of rendering a two-dimensional image from information indicating a surface of a three-dimensional object. The rendering processing unit 13 outputs calculation results thereof to the storing unit 12 and the input/output unit 14.

The input/output unit 14 includes means for controlling a display output device such as a monitor, means for controlling an input device such as a mouse, and the like. The input/output unit 14 outputs image data and the like which are generated by the rendering processing unit 13 and the like to the display output device and acquires information from an operator (user) through the input device under control of the central control unit 11.

Figure 2:
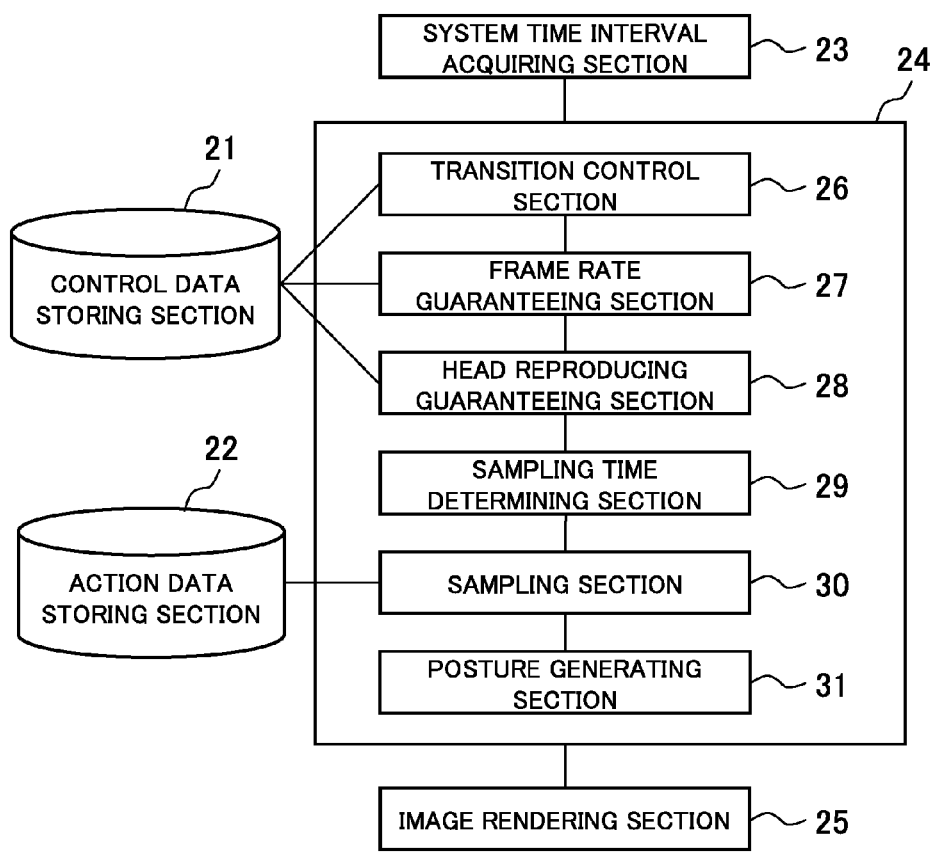
FIG. 2 is a diagram illustrating functional blocks of the image generating device according to the embodiment of the present invention.

FIG. 2 is a diagram illustrating functional blocks of the image generating device 1 according to the embodiment of the present invention. The image generating device 1 functionally includes a control data storing section 21, an action data storing section 22, a system time interval acquiring section 23, a posture acquiring section 24, and an image rendering section 25. The posture acquiring section 24 includes a transition control section 26, a frame rate guaranteeing section 27, a head reproducing guaranteeing section 28, a sampling time determining section 29, a sampling section 30, and a posture generating section 31. Those functions are implemented by the central control unit 11 and the rendering processing unit 13 executing the program stored in the storing unit 12 and controlling the input/output unit 14 and the like. Note that, in the following description, it is assumed that the respective functions are implemented by the arithmetic operations performed by the central control unit 11, but those functions may be implemented by cooperation between the central control unit 11 and the rendering processing unit 13. Roles to be separately played by the central control unit 11 and the rendering processing unit 13 may be arbitrary determined by a developer based on characteristics of the processing of this part when creating the program.

Figure 3:
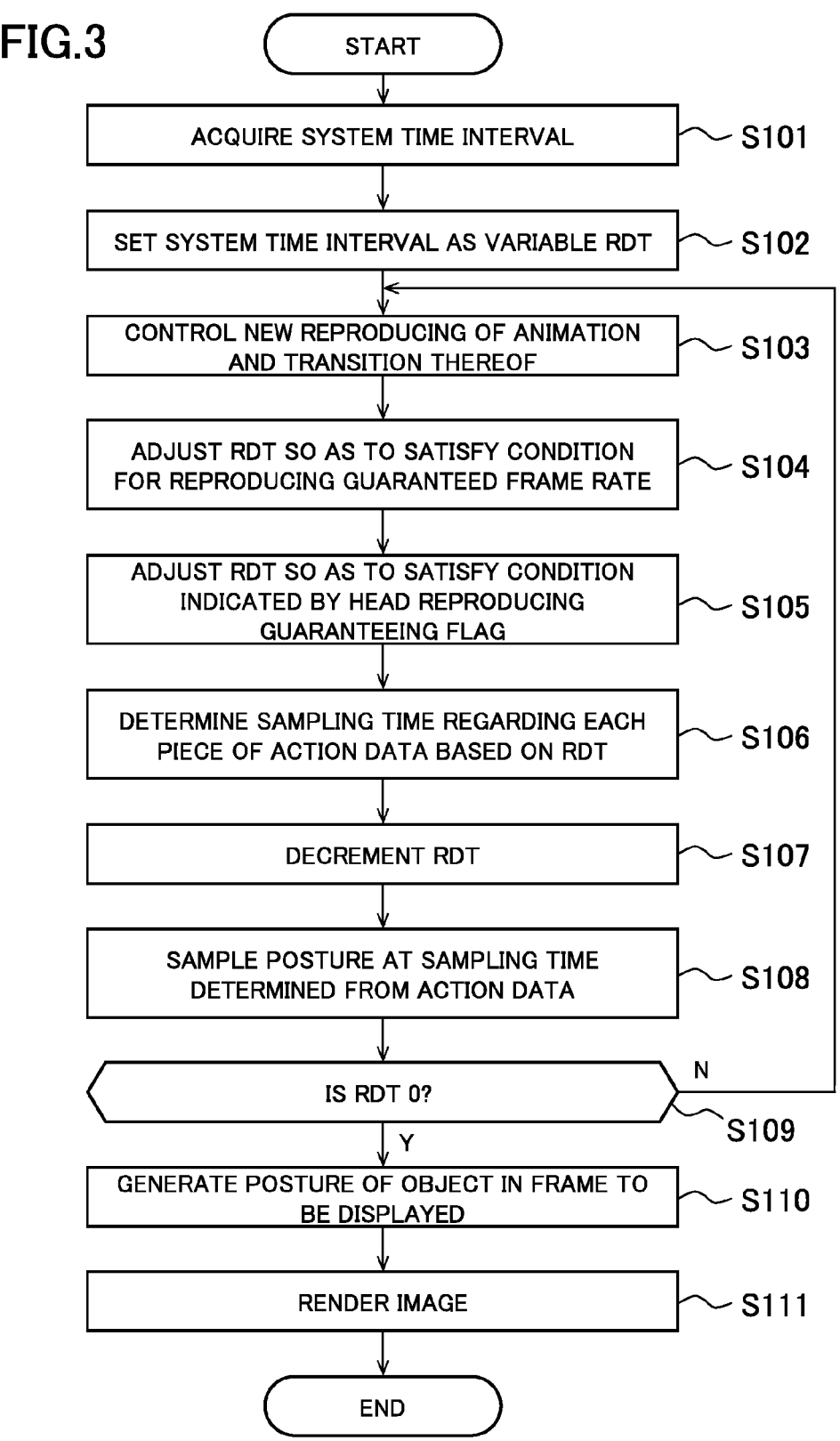
FIG. 3 is a flowchart illustrating an example of a process flow of the image generating device according to the embodiment of the present invention.

FIG. 3 is a flowchart illustrating an example of a process flow of the image generating device 1 according to the embodiment of the present invention. A following description is now given of functions of the image processing device 1 in accordance with the process flow. Note that, this process flow represents processing in a certain frame, and in an actual image generating device 1, the processing illustrated in FIG. 3 is repeated for each frame so that the motion picture is displayed by the display output device or the like.

The system time interval acquiring section 23 is implemented mainly by the central control unit 11 and the storing unit 12. The system time interval acquiring section 23 acquires a system time interval sysDT, which is an initial value of a time interval used for sampling described later, based on a processing time of processing for rendering an image of the previous frame (Step S101).

Figures 4, 5:
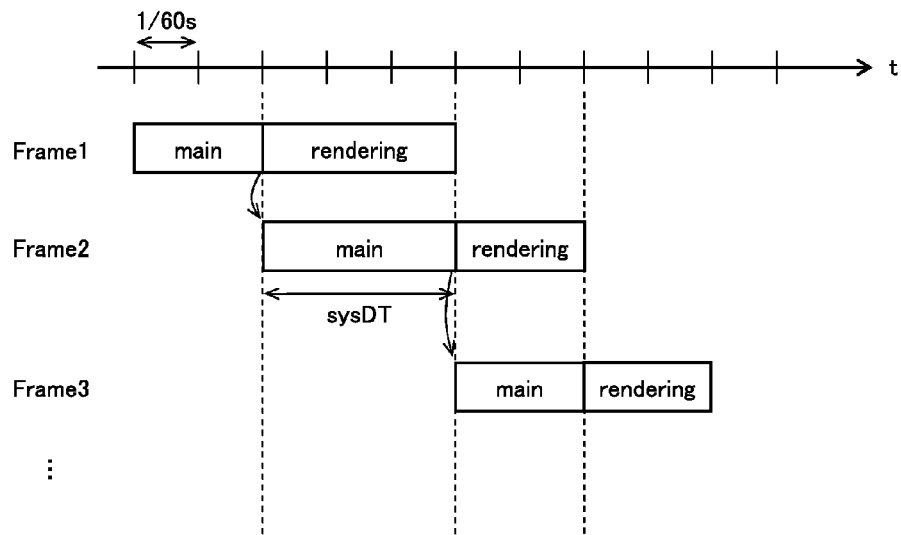
FIG. 4 is a diagram illustrating an example of a relationship between a frame and an actual time for rendering an image of the frame.
FIG. 5 is a table showing an example of control data.

FIG. 4 is a diagram illustrating an example of a relationship between a frame and an actual time for rendering an image of the frame. In the image generating device 1 according to this embodiment, the time interval between the frames changes depending on a calculation time of the processing for rendering the image of the frame. Such a method is called "variable frame rate". In FIG. 4, the rightward direction indicates a time axis, and one scale unit corresponds to one vertical blanking interval (in this example, 1/60 second). Each of bars arranged in the lower part of FIG. 4 corresponds to the frame, and the bars are arranged in an order in which the frames are displayed. Those bars each indicate an actual time span in which processing for rendering the corresponding frame is performed. The processing for one frame is divided into main processing ("main" in FIG. 4) and rendering processing ("rendering" in FIG. 4). The main processing includes processing for determining an action of each object, processing for acquiring a posture of the object from action data, and processing for performing a physical calculation and reflecting a dynamic condition on the posture. The rendering processing represents processing for rendering the image itself in a video memory by using the posture of the object determined by the main processing and information on a polygon that forms a surface of the object. After the rendering is finished, the image is displayed on the display output device. In this embodiment, the main processing for a given frame is performed within two vertical blanking intervals if the processing is not delayed, and the system time interval sysDT is 1/30 second. If much time is required for the main processing for some reason, the system time interval sysDT is extended in units of 1/60 second.

The posture acquiring section 24 and the transition control section 26 and the like that are included therein are implemented mainly by the central control unit 11 and the storing unit 12. Based on the action data, if the condition (condition for a reproducing guaranteed frame rate, a head frame reproducing guarantee, or the like described later) indicated by control data associated with the action data is satisfied, the posture acquiring section 24 acquires the posture of the object at a sampling time at which a time shorter than the system time interval sysDT has elapsed since a previous frame. On the other hand, if the condition is not satisfied, the posture acquiring section 24 acquires the posture of the object at a time point at which the system time interval sysDT has elapsed since the previous frame.

Note that, the sampling time differs from the actual time, and corresponds to a time (hereinafter referred to as "internal time") within a virtual space in which each object is placed. Therefore, in a case where the actual time that elapses after a given frame is displayed until the subsequent frame is displayed is 1/20 second, an interval between the sampling time for the given frame and the sampling time for the subsequent frame sometimes becomes 1/30 second. The progress of time is the same between the internal time and the sampling time. The term "internal time" is hereinafter used as a common time across all the objects. It is assumed here that the sampling time and a reproducing progress time AnimT described later are defined for each animation being reproduced. The sampling time and the reproducing progress time AnimT of the animation are expressed as the time that has elapsed since a start of the animation in the internal time.

A following description is now made of processing (Steps S102 to S110) of the posture acquiring section 24. First, the posture acquiring section 24 assigns the system time interval sysDT to a variable RDT indicating a remaining time (Step S102). The variable RDT indicates the time interval between the internal time at which the sampling is performed last time and the internal time corresponding to the frame to be displayed. The variable RDT is forcedly reduced in the processing of a frame rate guaranteeing section 27 or a head reproducing guaranteeing section 28 described later. Note that, in the image generating device 1 according to this embodiment, there is a case where the sampling is performed a plurality of times in order to display one frame. Specific examples thereof include a case where a transition of the animation or the like occurs between the internal time corresponding to the previous frame and the internal time corresponding to the frame to be currently displayed. In such a case, the posture generating section 31 described later uses the posture of the object sampled at the last timing of the animation being reproduced in the previous frame in order to naturally connect the animations. In the case where the sampling is performed a plurality of times in order to display one frame, the processing of Steps S103 to S108 is repeated.

Next, the transition control section 26 controls a new reproducing of the animation and a transition thereof (Step S103). In this example, the action of each object is expressed by repeated transitions from one animation to another animation in the course of the progress of time. Specific examples include a case where one object transitions from a standing animation to a walking animation after the standing animation is finished.

FIG. 5 is a table showing an example of the control data. The control data is stored in the control data storing section 21 that is implemented mainly by the storing unit 12. The control data includes, for each animation, an ID of the action data used in the reproducing, an ID of the subsequent animation to which the transition is made after the reproducing is finished, a flag as to whether or not to effect the head frame reproducing guarantee, a setting of the reproducing guaranteed frame rate, and the like. In a case where a field of the reproducing guaranteed frame rate is filled with a number, a reciprocal thereof indicates a maximum time interval between the frames, and control is performed in processing described later so that the sampling time interval between the frames may not exceed the maximum time interval. Note that, the animation whose reproducing guaranteed frame rate is not designated is not controlled based on the reproducing guaranteed frame rate.

If the reproducing of a given animation is finished at the internal time during the processing, the transition control section 26 acquires the information on the animation to be reproduced subsequently to the given animation from the control data, and changes the information on the animation included in a list of animations being reproduced to the information on the subsequent animation. The animation whose reproducing has been thus finished is caused to transition to the subsequent animation. Then, the reproducing progress time AnimT of the animation to which the transition has been made is set to 0. Further, if an instruction to reproduce a new animation for any one of the objects is received from the input/output unit 14 or another function, the new animation is added to the list of animations being reproduced, and the reproducing progress time AnimT of the new animation is set to 0.

Figure 6:
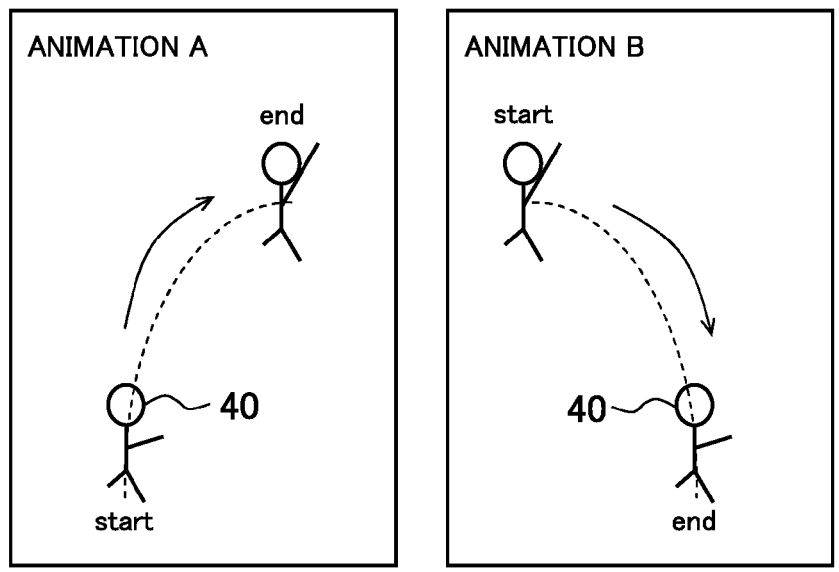
FIG. 6 is a diagram illustrating an example of an action of an object in each of Animations A and B indicated by action data.
Figure 7:
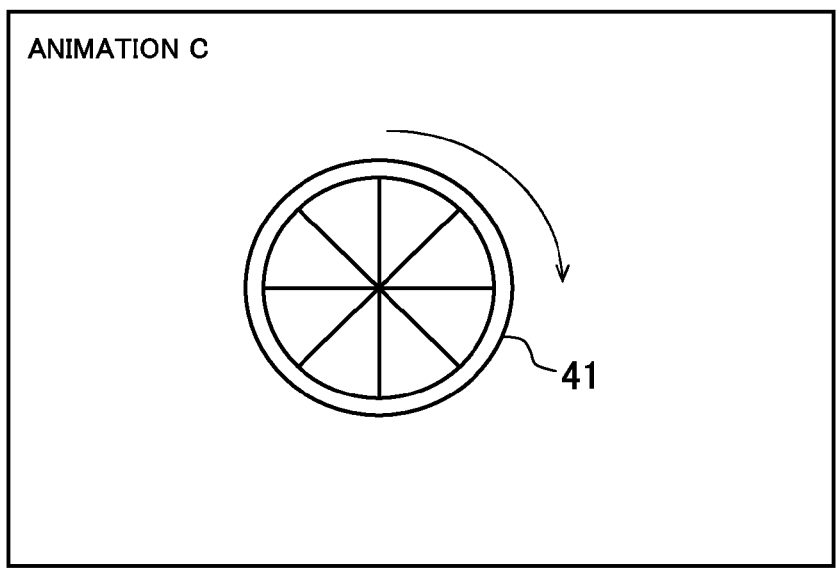
FIG. 7 is a diagram illustrating an example of an action of an object in Animation C indicated by the action data.

The action data represents data indicating the posture of the object according to time for each of the animations. A length (period) of time for a reproducing is determined for each animation. FIG. 6 is a diagram illustrating an example of the action of the object in each of Animations A and B indicated by the action data. For example, Animation A represents an animation expressing a change in the posture of a human-shaped object 40 after the start of a jump until a peak thereof is reached, and Animation B represents an animation expressing the change after the peak of the jump is reached by the object 40 until a landing is made. The example of FIG. 5 corresponds to the example of FIG. 6, and after the reproducing of Animation A is finished, the transition is made to cause Animation B to be reproduced in succession to the Animation A. The sequential reproducing of Animation A and Animation B expresses a series of jumping action. FIG. 7 is a diagram illustrating an example of the action of the object in Animation C indicated by the action data. Animation C represents an animation expressing a rotating action of a wheel-like object 41.

Next, the frame rate guaranteeing section 27 adjusts RDT so as to satisfy the condition for the reproducing guaranteed frame rate regarding the animation being reproduced (Step S104). Details of processing thereof are described below.

Figure 8:
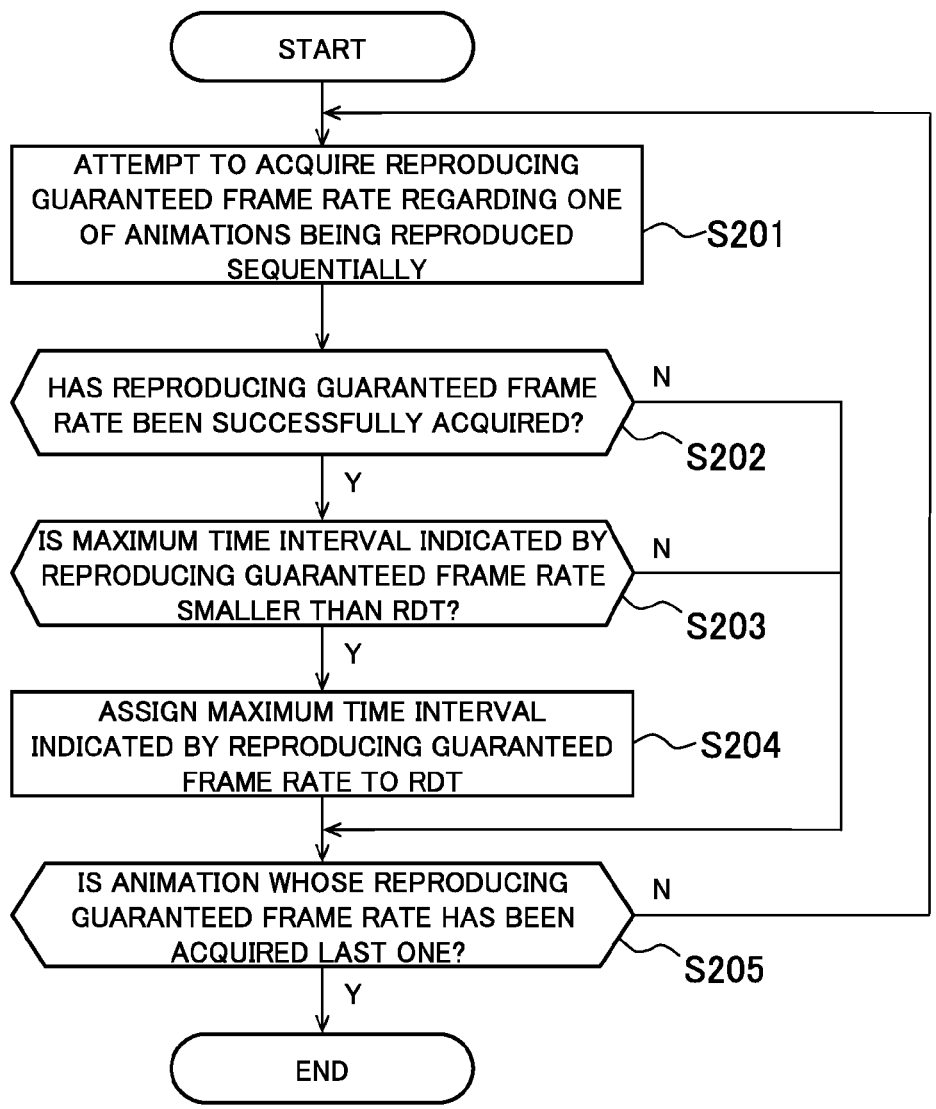
FIG. 8 is a flowchart illustrating an example of a processing flow of a frame rate guaranteeing section.

FIG. 8 is a flowchart illustrating an example of a processing flow of the frame rate guaranteeing section 27. The frame rate guaranteeing section 27 attempts to acquire the reproducing guaranteed frame rate regarding one of the animations being reproduced in accordance with a sequence (Step S201). When the reproducing guaranteed frame rate is successfully acquired (Y in Step S202), and when the maximum time interval indicated by the reproducing guaranteed frame rate is smaller than RDT (Y in Step S203), the maximum time interval indicated by the reproducing guaranteed frame rate is assigned to RDT (Step S204). When the reproducing guaranteed frame rate fails to be acquired (N in Step S202), or when the maximum time interval indicated by the reproducing guaranteed frame rate is equal to or larger than RDT (N in Step S203), the processing of Step S204 is skipped. Then, when the animation being reproduced whose reproducing guaranteed frame rate has been acquired is not the last one (N in Step S205), the processing loops back to Step S201. Alternatively, when the animation whose reproducing guaranteed frame rate has been acquired is the last animation (Y in Step S205), the processing of the frame rate guaranteeing section 27 is brought to an end.

Such processing causes RDT to become equal to or smaller than the smallest value among the maximum time intervals respectively associated with a plurality of animations being reproduced. This corresponds to, except for a special case described later, the interval between the sampling time for the previous frame and the sampling time for the frame to be displayed becoming equal to or smaller than the smallest value among the maximum time intervals indicated by the reproducing guaranteed frame rate regarding the animations being reproduced. As a result, it is possible to prevent such a situation that a characteristic of the action cannot be expressed. For example, in a case where a wheel is caused to rotate, the wheel appearing to be rotating reversely can be avoided by previously preventing the interval between the internal times for the frames from becoming excessively large.

Next, the head reproducing guaranteeing section 28 adjusts RDT so as to satisfy the condition indicated by a head reproducing guaranteeing flag regarding the animation being reproduced (Step S105). Details of processing thereof are described below.

Figure 9:
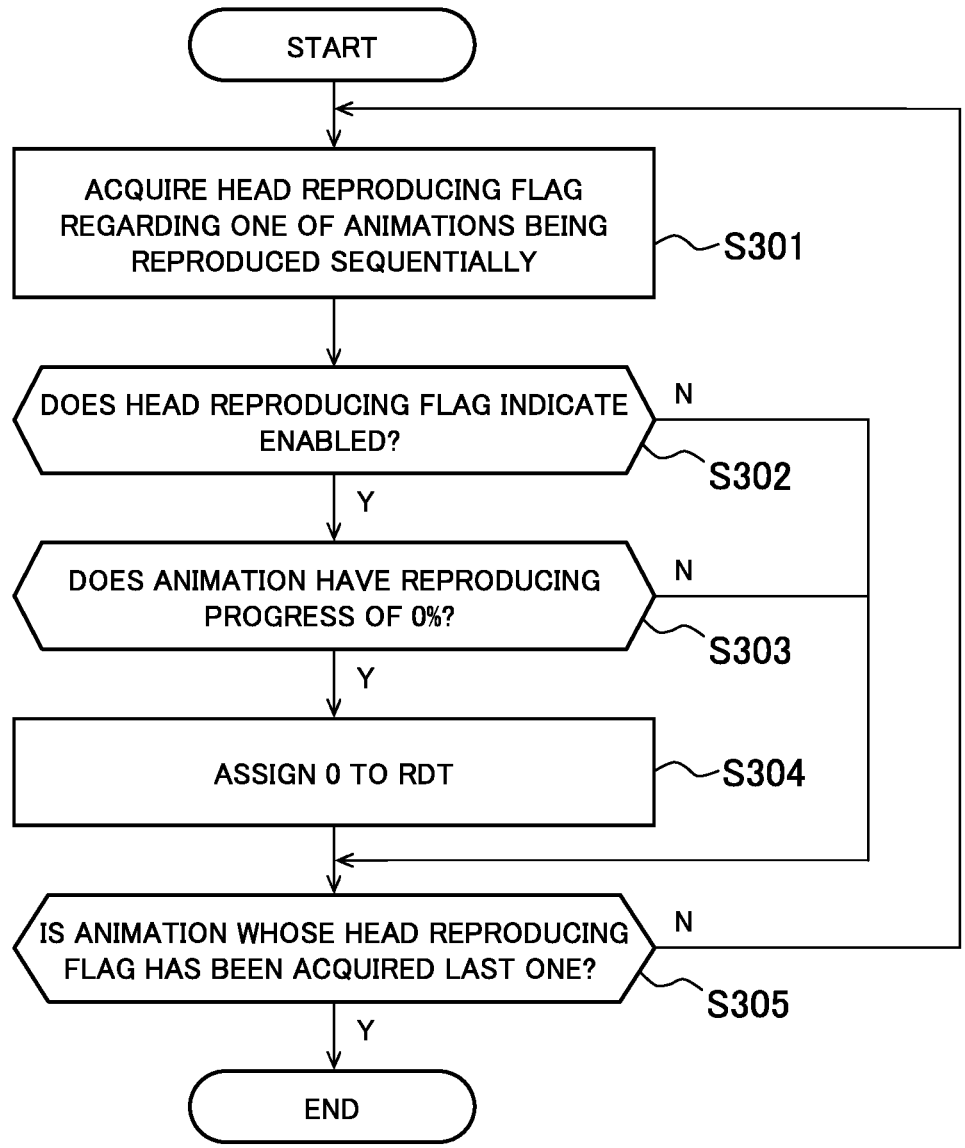
FIG. 9 is a flowchart illustrating an example of a processing flow of a head reproducing guaranteeing section.

FIG. 9 is a flowchart illustrating an example of a processing flow of the head reproducing guaranteeing section 28. The head reproducing guaranteeing section 28 acquires a head reproducing flag regarding one of the animations being reproduced in accordance with the sequence (Step S301). When the head reproducing flag is "true", indicating that reproducing a head frame is enabled (Y in Step S302), and when the animation has a reproducing progress of 0% (Y in Step S303), 0 is assigned to RDT (Step S304). When the head reproducing flag is "false", indicating that reproducing the head frame is disabled (N in Step S302), or when the animation does not have a reproducing progress of 0% (N in Step S303), the processing of Step S304 is skipped. Then, when the animation being reproduced whose head reproducing flag has been acquired is not the last animation (N in Step S305), the processing loops back to Step S301. Alternatively, when the animation being reproduced whose head reproducing flag has been acquired is the last animation (Y in Step S305), the processing of the head reproducing guaranteeing section 28 is brought to an end. The reproducing progress as used herein represents a ratio of the internal time that has elapsed since the start of the animation to a reproducing period of the animation.

The above-mentioned processing causes RDT to become 0 when there exists an animation to which the transition has just been made and when the head reproducing flag of the animation is "true". When this RDT becomes 0, the internal time corresponding to the frame to be displayed becomes a timing of the head of the animation to which the transition has been made, and the sampling times regarding the other animations are also caused to correspond to the internal time. Note that, after performing the processing for substituting 0 into RDT for one of the plurality of animations, there is no need to perform the processing of Steps S301 to S304 for the animations that comes subsequently in the sequence.

Further, as a result of the above-mentioned processing, when the system time interval sysDT between the previous frame and the frame to be displayed includes the timing of the head of the animation indicated by the action data, and when the head reproducing guaranteeing flag is enabled, the sampling time regarding each animation for the frame to be displayed is set as the timing of the head of the animation, and the posture at the timing is acquired in sampling processing described later. A specific example thereof is described later.

Figure 10:
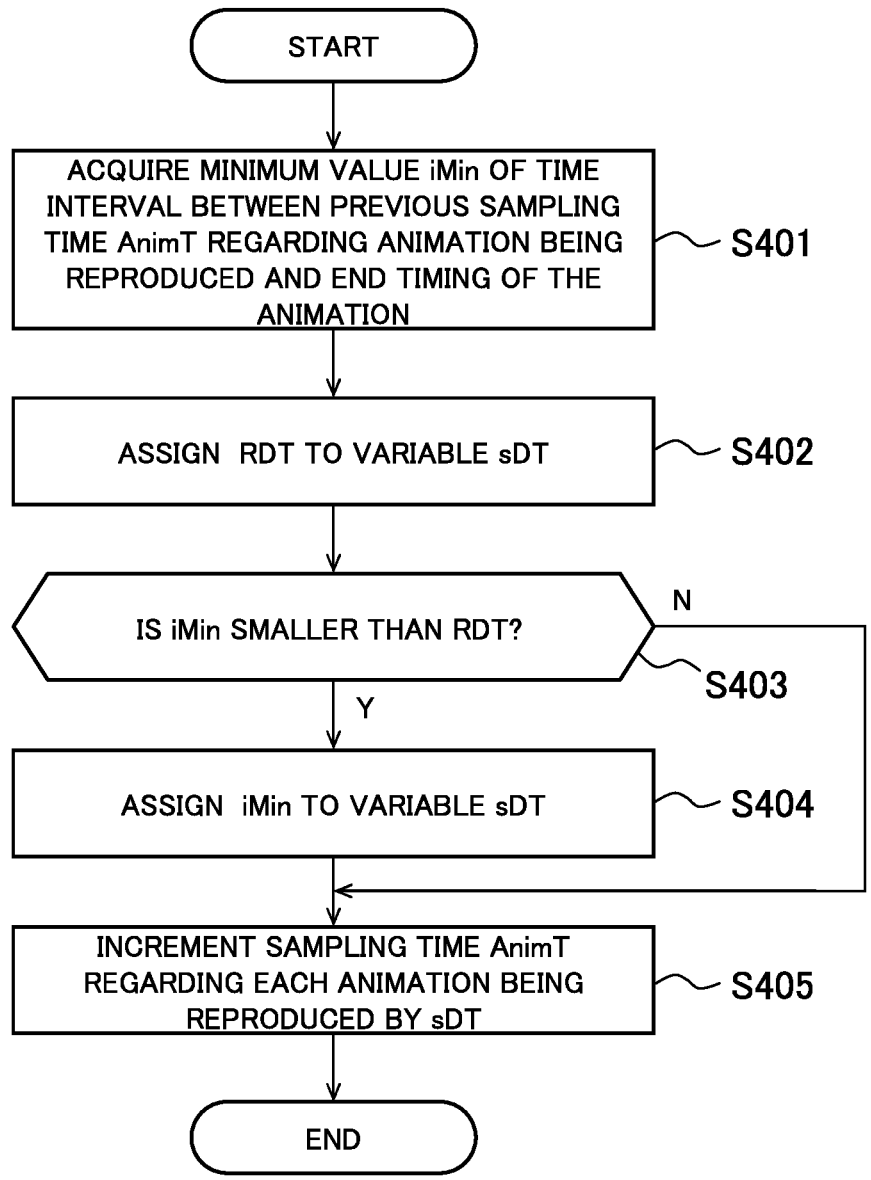
FIG. 10 is a flowchart illustrating an example of a processing flow of a sampling time determining section.

Next, the sampling time determining section 29 determines the sampling time AnimT regarding the action data corresponding to each animation based on RDT (Step S106). FIG. 10 is a flowchart illustrating an example of a processing flow of the sampling time determining section 29. The processing of Step S106 is now described in detail.

First, the sampling time determining section 29 acquires, for each of the animations being reproduced, the time interval between the previous sampling time and a reproducing end time of the animation, and acquires a minimum value iMin of the time interval (Step S401). Then, the sampling time determining section 29 assigns RDT to a variable sDT indicating a sampling time interval (Step S402). When iMin is smaller than RDT (Y in Step S403), iMin is assigned to sDT (Step S404). When iMin is equal to or larger than RDT (N in Step S403), Step S404 is skipped. The variable sDT indicates the time interval between the internal time for the previous sampling and the internal time for the subsequent sampling. Further, sDT becomes a smaller one of the values RDT and iMin.

Then, the sampling time determining section 29 increments the sampling time AnimT regarding each animation being reproduced by sDT (Step S405). The sampling time AnimT represents the timing to sample the posture of the object from the action data with regard to the animation being reproduced. Accordingly, when the reproducing of any one of the animations being reproduced is finished during a period after the previous sampling is performed and before RDT has elapsed, the postures of the respective objects at the timing of the end are to be sampled, and when the reproducing of none of the animations is finished, the posture at the timing for the frame to be currently displayed is to be sampled.

Next, the posture acquiring section 24 decrements RDT by sDT (Step S107). Further, with regard to each of the animations being reproduced, the sampling section 30 samples the posture of the object at the sampling time AnimT from the action data on the animation (Step S108).

When RDT is not 0 (N in Step S109), it is probable that the timing at which the sampling is performed in Step S108 may not yet have reached the internal time for the frame to be displayed, and hence the posture acquiring section 24 repeats the processing from Step S103 to perform the subsequent sampling. Alternatively, when RDT is 0 (Y in Step S109), the timing at which the sampling is performed in Step S108 has reached the internal time for the frame to be displayed, and hence the processing of Step S110 and the subsequent step is performed.

Figure 11:
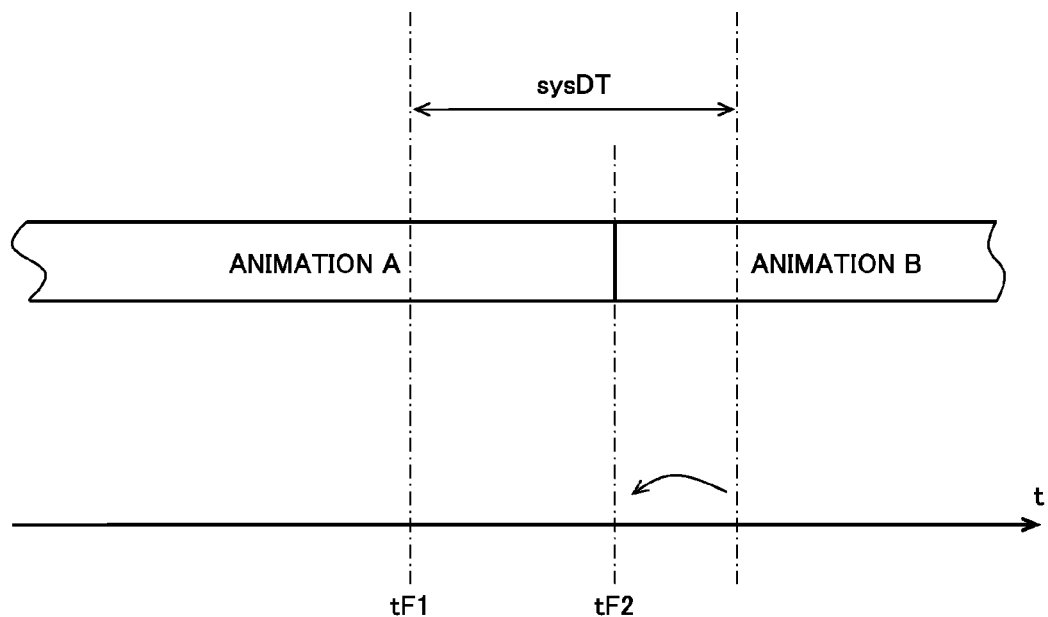
FIG. 11 is a diagram illustrating an example of a sampling time used in a case where processing for guaranteeing a head reproducing is performed.

FIG. 11 is a diagram illustrating an example of the sampling time used in a case where processing for guaranteeing reproducing a head frame is performed. FIG. 11 also corresponds to FIG. 5, and Animation B is assumed to be subjected to the head frame reproducing guarantee. In the example of FIG. 11, an internal time tF2 for the current frame is a time point at which a time shorter than the system time interval sysDT has elapsed since an internal time tF1 for the previous frame, and is a timing of the head of Animation B whose head reproducing guaranteeing flag indicates enabled. The time at which the system time interval sysDT has elapsed since the internal time tF1 is not used as the time at which the sampling is performed for the subsequent frame. This allows a characteristic action regarding each piece of action data to be expressed.

Figure 12:
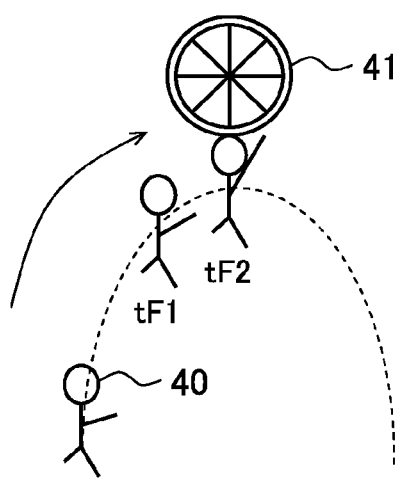
FIG. 12 is a diagram illustrating an example of the actions of the objects in an animation for which a head reproducing guaranteeing flag is enabled.

FIG. 12 is a diagram illustrating an example of the actions of the objects in the animation for which the head reproducing guaranteeing flag is enabled. FIG. 12 illustrates an example in which the human-shaped object 40 jumps to collide with the wheel-shaped object 41 at the peak thereof. The head of Animation B corresponds to the peak, and hence the image of the frame in which the object 40 has reached the peak is displayed without exception, with the result that the user can visually recognize that the object 40 has collided with the object 41. Further, in such a characteristic phenomenon, collision judgment processing and the like can be performed with reliability.

Figure 13:
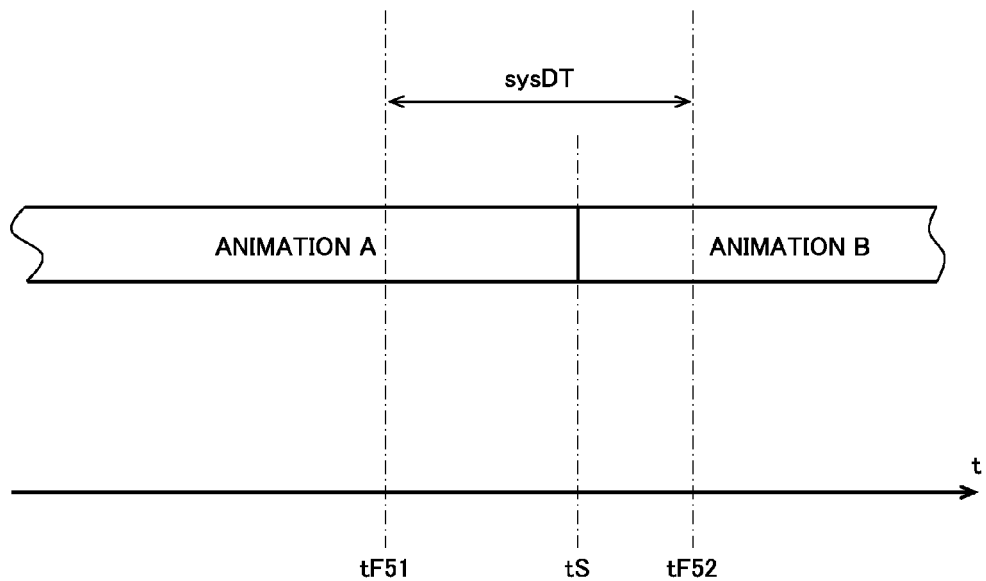
FIG. 13 is a diagram illustrating an example of the sampling time used in a case where the processing for guaranteeing the head reproducing is not performed.
Figure 14:
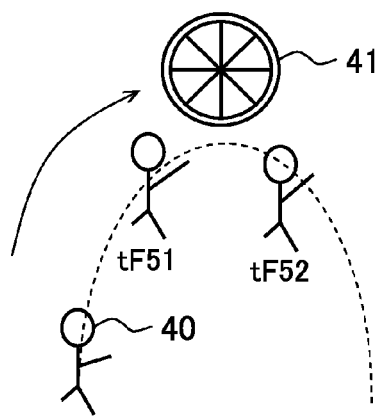
FIG. 14 is a diagram illustrating an example of the actions of the objects in the case illustrated in FIG. 13.

On the other hand, when the processing for guaranteeing reproducing the head frame is not performed, a different result is produced. FIG. 13 is a diagram illustrating an example of the sampling time used in a case where the processing for guaranteeing reproducing the head frame is not performed. FIG. 14 is a diagram illustrating an example of the actions of the objects in the case illustrated in FIG. 13. In FIGS. 13 and 14, it is assumed that the processing for guaranteeing reproducing the head frame is not performed with regard to Animation B. In this case, the interval between an internal time tF51 for the previous frame and an internal time tF52 for the frame to be currently displayed is set as the system time interval sysDT. Further, at a timing tS at which the reproducing of Animation A is finished, the posture of the object is sampled for the posture generating section 31 described later, but the posture of the object in the current frame is strictly generated mainly based on the posture of the object sampled at the internal time tF52. Therefore, in FIG. 14, the human-shaped object 40 does not reach the peak, and a collision with the wheel-shaped object 41 is not expressed.

Note that, it is not always necessary to guarantee reproducing only the head frame of the animation. An arbitrary timing for guaranteeing the reproducing may be stored as the control data for the animation, and the posture of the object at the timing may be sampled when the stored timing is included in the system time interval sysDT. In this case, the posture acquiring section 24 may perform the processing with a concern for the timing for guaranteeing the reproducing. It should be noted, however, that the processing becomes complicated in this case, which raises a fear that speed may be lowered or other such fear. The above-mentioned effects can be more flexibility and easily realized by the configuration described so far in which the processing for guaranteeing the reproducing of the head is combined with the transition of the animation.

Figure 15:
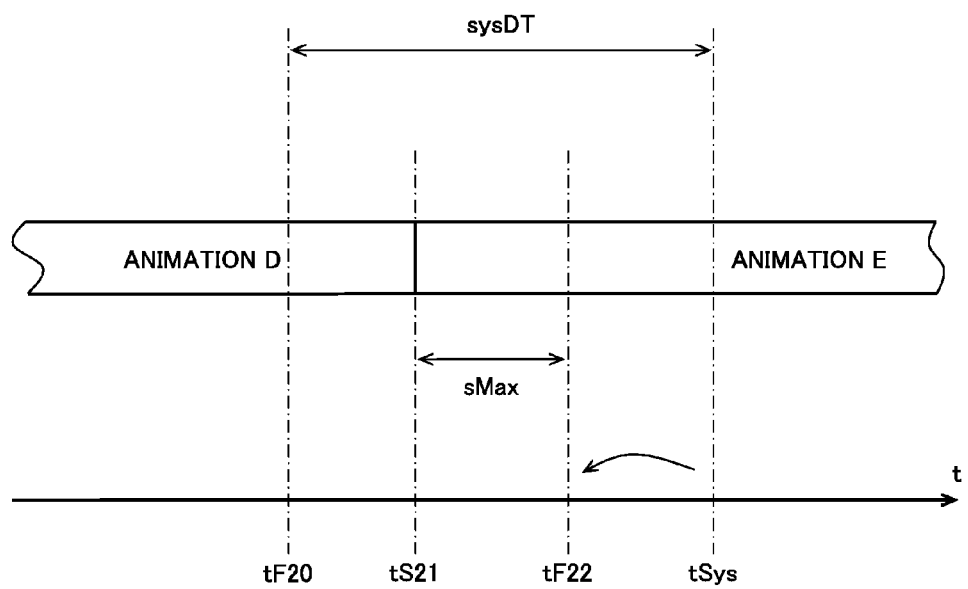
FIG. 15 is a diagram illustrating an example of a case where a frame rate is guaranteed.

Note that, the operation may be performed by combining the transition of the animation with the reproducing guaranteed frame rate of the animation to which the transition is made. FIG. 15 is a diagram illustrating an example of a case where the frame rate is guaranteed. Assuming that a time obtained by adding the system time interval sysDT to an internal time tF20 for the previous frame is set as tSys, when the interval between an internal time tS21 being the timing at which the animation is caused to transition and tSys is larger than a maximum time interval sMax indicated by the reproducing guaranteed frame rate, the internal time tF22 for the frame to be currently displayed is obtained as tS21+sMax.

In Step S110, the posture generating section 31 generates the posture of each of the objects in the frame to be displayed (Step S110). When a transition is made from a given animation to the subsequent animation during the period from the previous frame to the frame to be currently displayed, the posture generating section 31 blends the posture at the timing of the end of the given animation with the posture in the subsequent animation to generate the posture of the object in the frame. This can suppress unnatural display due to displacement of the posture caused by a change of the animation. The generated posture of each object is used as the posture of each object to be acquired by the posture acquiring section 24 and output to the image rendering section 25.

The image rendering section 25 is implemented mainly by the central control unit 11, the rendering processing unit 13, the storing unit 12, and the input/output unit 14. Next, the image rendering section 25 renders an image indicating the posture of each object acquired by the posture acquiring section 24 (Step S111). Further, data on the rendered image is output to the display output device so that the image is output by the display output device. More specifically, the image rendering section 25 arranges the respective objects in a space for display, and adjusts the postures of the objects and arrangement thereof based on a positional relationship between one object and another object. Further, a ragdoll corresponding to a skeleton included in the object is used to simulate a physical behavior of each of the objects. Then, the image rendering section 25 corrects the postures of the objects and arrangement thereof based on the results of the simulation, and renders the image of each object in processing of a so-called rendering engine.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A computer-readable non-transitory storage medium having stored thereon a program for causing a computer to execute processing for:
    acquiring action data corresponding to an object to be displayed, said action data including a predetermined animation sequence associated with the object;
    acquiring a tentative time interval between a frame for generating an image and a previous frame based on a frame rate of the previous frame;
    acquiring, when a condition of the predetermined animation sequence associated with the action data indicating a guaranteed posture of the object in accordance with time is satisfied, the guaranteed posture of the object based on the action data at a time point at which a time interval shorter than the tentative time interval has elapsed since a start of the previous frame; and
    rendering the image indicating the guaranteed posture of the object as a start of the frame at the time point before the tentative time interval based on the frame rate of the previous frame elapses in place of an original image comprising the object in a different posture in the predetermined animation sequence at the tentative time interval.

2. The computer-readable non-transitory storage medium having stored thereon a program according to claim 1, wherein the processing for acquiring the posture of the object comprises acquiring, when the tentative time interval comprises a time point associated with the action data, the posture of the object at the associated time point.

3. The computer-readable non-transitory storage medium having stored thereon a program according to claim 2, wherein:
    the action data indicates the posture of the object in accordance with time during a given period; and the processing for acquiring the posture of the object comprises acquiring, when the tentative time interval comprises a time point of a head of the given period within the action data, the posture of the object at the time point of the head.

4. The computer-readable non-transitory storage medium having stored thereon a program according to claim 3, wherein the head of the given period within the action data sequentially follows an end of a period within previous action data that comes before a transition is made to the action data.

5. The computer-readable non-transitory storage medium having stored thereon a program according to claim 1, wherein the processing for acquiring the posture of the object comprises acquiring, when a maximum time interval associated with the action data is smaller than the tentative time interval, the posture of the object at a time point at which the maximum time interval has elapsed since the previous frame.

6. An image generating device, comprising:
   action data acquisition means for acquiring action data corresponding to an object to be displayed, said action data including a predetermined animation sequence associated with the object;
   tentative time interval acquisition means for acquiring a tentative time interval between a frame for generating an image and a previous frame based on a frame rate of the previous frame;
   posture acquisition means for acquiring, when a condition of the predetermined animation sequence associated with the action data indicating a guaranteed posture of the object in accordance with time is satisfied, the guaranteed posture of the object based on the action data at a time point at which a time interval shorter than the tentative time interval has elapsed since a start of the previous frame; and
   image outputting means for outputting data on the image indicating the guaranteed posture of the object as a start of the frame at the time point before the tentative time interval based on the frame rate of the previous frame elapses in place of an original image comprising the object in a different posture in the predetermined animation sequence at the tentative time interval.

7. An image generating method, comprising:
acquiring action data corresponding to an object to be displayed, said action data including a predetermined animation sequence associated with the object;
acquiring a tentative time interval between a frame for generating an image and a previous frame based on a frame rate of the previous frame;
acquiring, when a condition of the predetermined animation sequence associated with the action data indicating a guaranteed posture of the object in accordance with time is satisfied, the guaranteed posture of the object based on the action data at a time point at which a time interval shorter than the tentative time interval has elapsed since a start of the previous frame; and
outputting data on the image indicating the guaranteed posture of the object as a start of the frame at the time point before the tentative time interval based on the frame rate of the previous frame elapses in place of an original image comprising the object in a different posture in the predetermined animation sequence at the tentative time interval.

* * * * *